US011700801B2

(12) United States Patent
Nguyen et al.

(10) Patent No.: US 11,700,801 B2
(45) Date of Patent: Jul. 18, 2023

(54) ALTERNATE WETTING AND DRYING (AWD) SYSTEM AND METHOD

(71) Applicant: RYNAN TECHNOLOGIES PTE. LTD., Singapore (SG)

(72) Inventors: My T. Nguyen, Tra Vinh (VN); Cuong Q. Hong, Tra Vinh (VN); Luong V. Truong, Chau Thanh District (VN); Toan Q. Tran, Cang Long District (VN); Trieu T. Le, Hon Dat District (VN); Bien T. Mai, Cau Ke District (VN); An Trinh, Tra Vinh (VN); Thong A. Nguyen, Tra Vinh (VN); Khang M. Duong, Ninh Kieu (VN)

(73) Assignee: RYNAN TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 17/825,446

(22) Filed: May 26, 2022

(65) Prior Publication Data

US 2022/0279740 A1  Sep. 8, 2022

Related U.S. Application Data

(62) Division of application No. 16/330,834, filed as application No. PCT/CA2017/051045 on Sep. 7, 2017, now Pat. No. 11,369,067.

(Continued)

(51) Int. Cl.
*A01G 25/16* (2006.01)
*A01G 25/00* (2006.01)

(52) U.S. Cl.
CPC ........... *A01G 25/165* (2013.01); *A01G 25/00* (2013.01); *A01G 25/16* (2013.01); *A01G 25/167* (2013.01);
(Continued)

(58) Field of Classification Search
CPC ...... A01G 25/00; A01G 25/16; A01G 25/165; Y10T 137/1866; Y10T 137/189; G05D 9/00; G05D 9/12; G01F 23/30
See application file for complete search history.

(56) References Cited

U.S. PATENT DOCUMENTS 4,244,385 A * 1/1981 Hotine ............... G05D 9/12
  307/118
4,265,262 A * 5/1981 Hotine ............... G05D 9/12
  307/118

(Continued)

FOREIGN PATENT DOCUMENTS

CA     2688197 A1    6/2010
CN   101280783 A    10/2008
(Continued)

*Primary Examiner* — David Colon-Morales

(57) ABSTRACT

An Alternate Wetting and Drying (AWD) method/system for irrigating a field using a pump comprising an outlet supplying water to the field and an inlet connected to a water source is disclosed. The method/system comprises a sensor placed at a location in the field for sensing a water depth below a surface of the field and transmitting the water depth to a controller located remotely from the sensing location using a wireless connection. The controller enables the pump when the sensed water depth is below a threshold depth and disables the pump when the sensed water depth is above a threshold depth.

18 Claims, 22 Drawing Sheets

Related U.S. Application Data

(60) Provisional application No. 62/384,318, filed on Sep. 7, 2016.

(52) U.S. Cl.
CPC ...... *Y10T 137/189* (2015.04); *Y10T 137/1866* (2015.04)

(56) References Cited

U.S. PATENT DOCUMENTS

| | | | |
|---|---|---|---|
| 4,676,264 A | 6/1987 | Wiseman | |
| 8,191,307 B2* | 6/2012 | Donoghue | A01G 25/16 |
| | | | 47/79 |
| 8,408,229 B2* | 4/2013 | Goldberg | A01G 27/001 |
| | | | 47/79 |
| 8,620,480 B2 | 12/2013 | Alexanian | |
| 8,760,302 B1* | 6/2014 | MacDonald | F04B 23/021 |
| | | | 340/602 |
| 8,857,730 B2* | 10/2014 | Hartfelder | A01G 25/16 |
| | | | 239/69 |
| 9,872,445 B2 | 1/2018 | Cline et al. | |
| 10,711,788 B2* | 7/2020 | Mayleben | F04D 13/068 |
| 10,973,183 B2 | 4/2021 | Gungl et al. | |
| 11,178,831 B2 | 11/2021 | Gungl et al. | |
| 2005/0192710 A1 | 9/2005 | Thornton et al. | |
| 2008/0154437 A1 | 6/2008 | Alexanian | |
| 2010/0030476 A1 | 2/2010 | Woytowitz et al. | |
| 2011/0174706 A1* | 7/2011 | Russell | A01G 25/00 |
| | | | 405/36 |
| 2015/0227142 A1* | 8/2015 | Hutchings | G05B 15/02 |
| | | | 700/282 |
| 2018/0014452 A1 | 1/2018 | Starr | |

FOREIGN PATENT DOCUMENTS

| | | |
|---|---|---|
| CN | 203327667 U | 12/2013 |
| CN | 105123446 A | 12/2015 |
| CN | 105684837 A | 6/2016 |
| CN | 109862779 B | 5/2022 |

\* cited by examiner

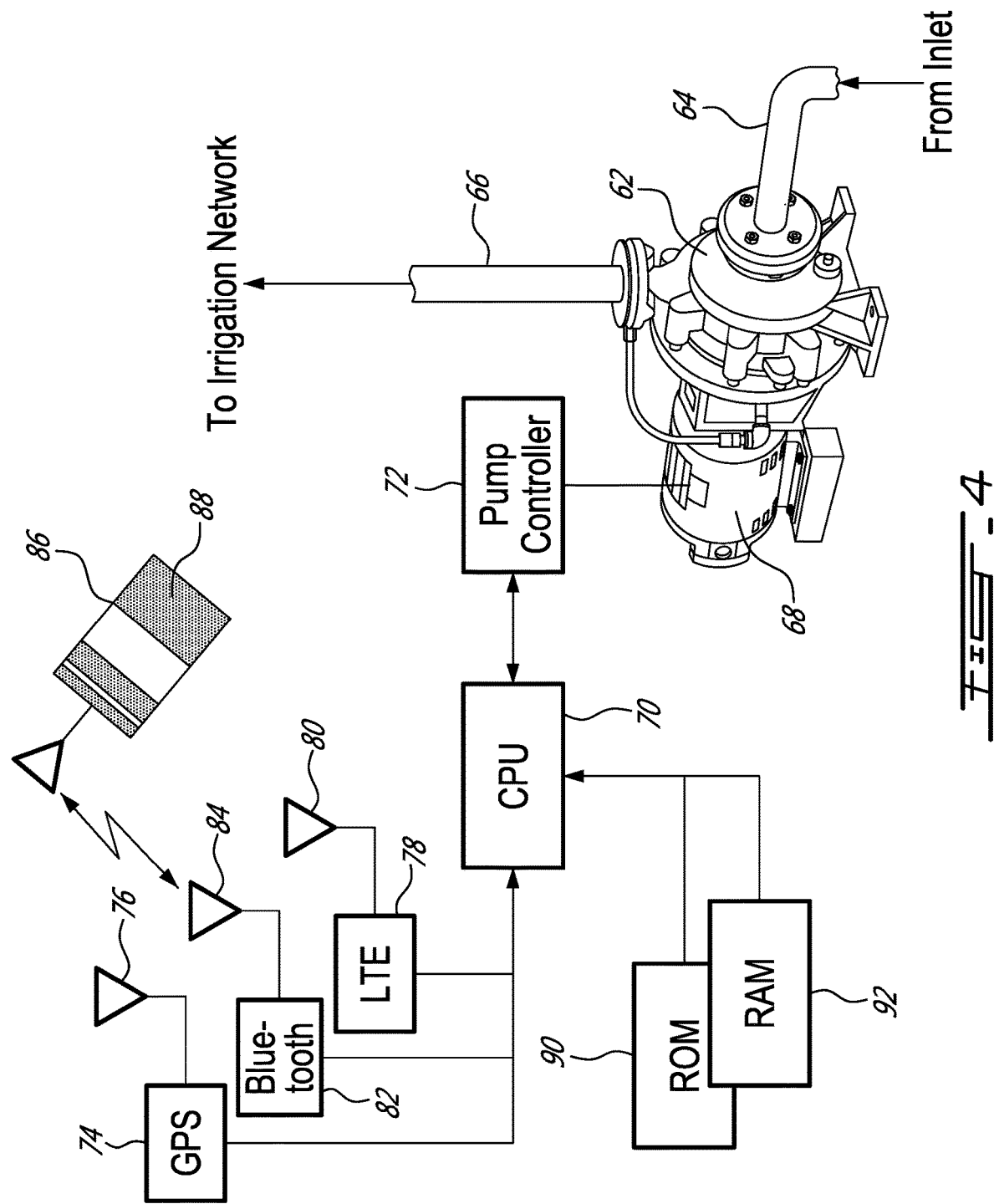

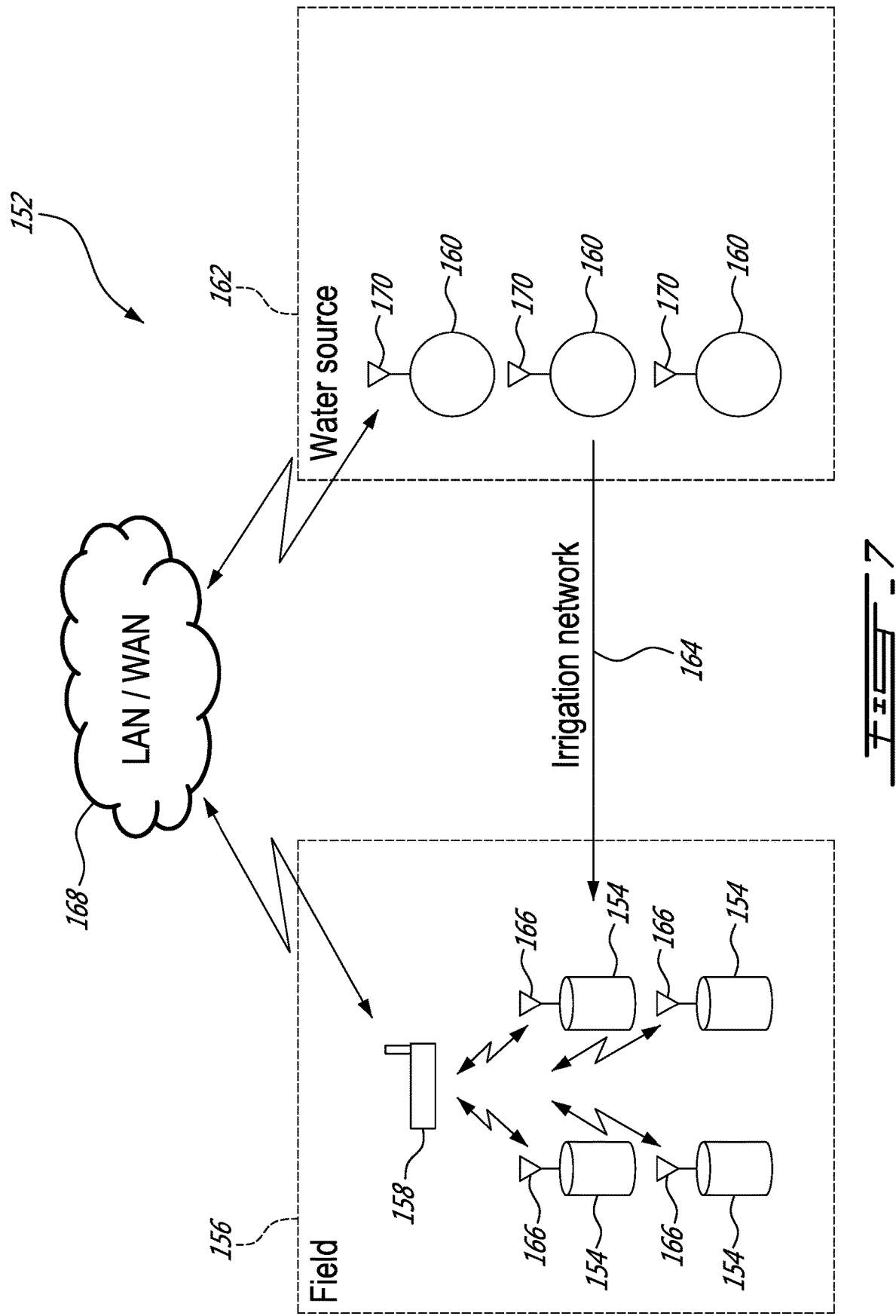

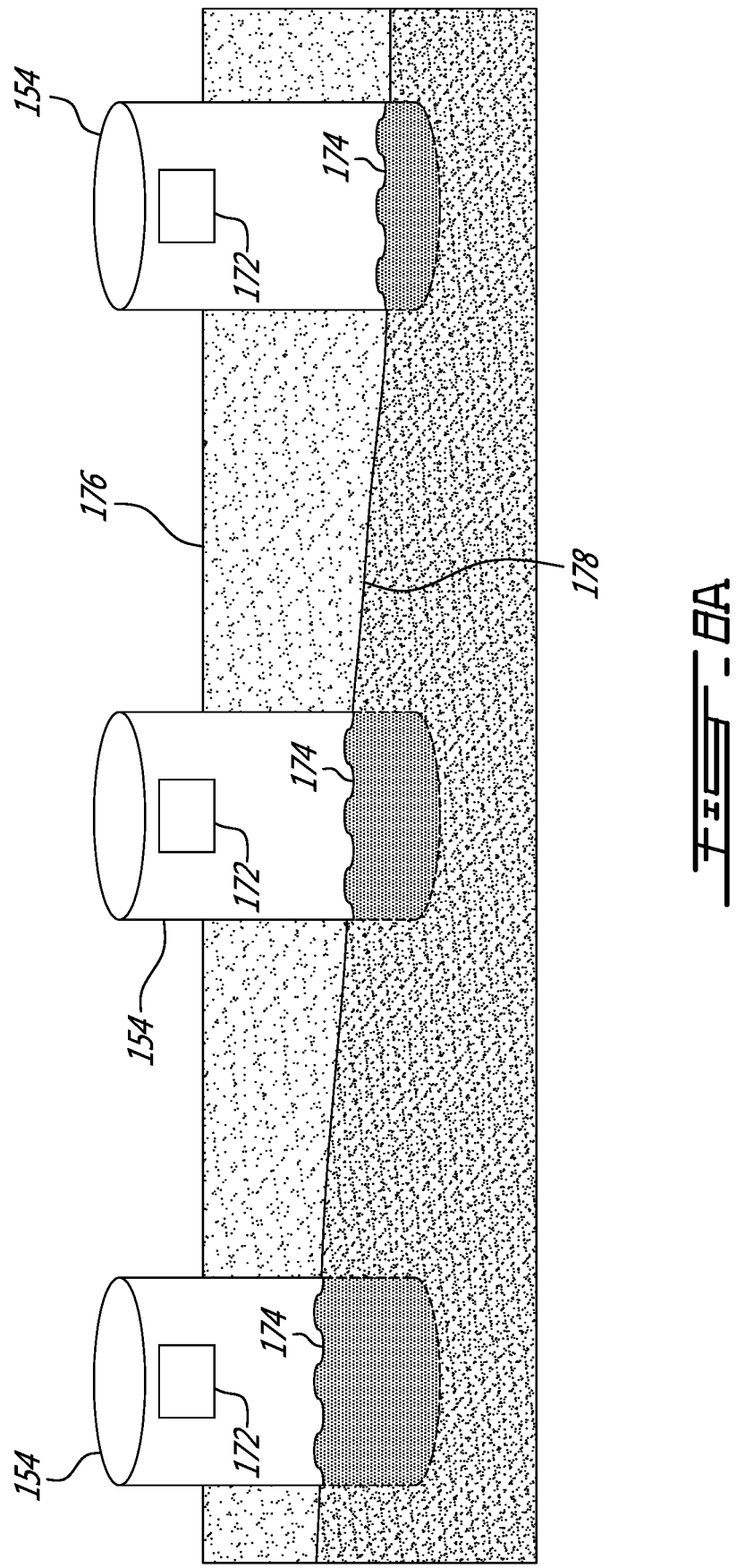

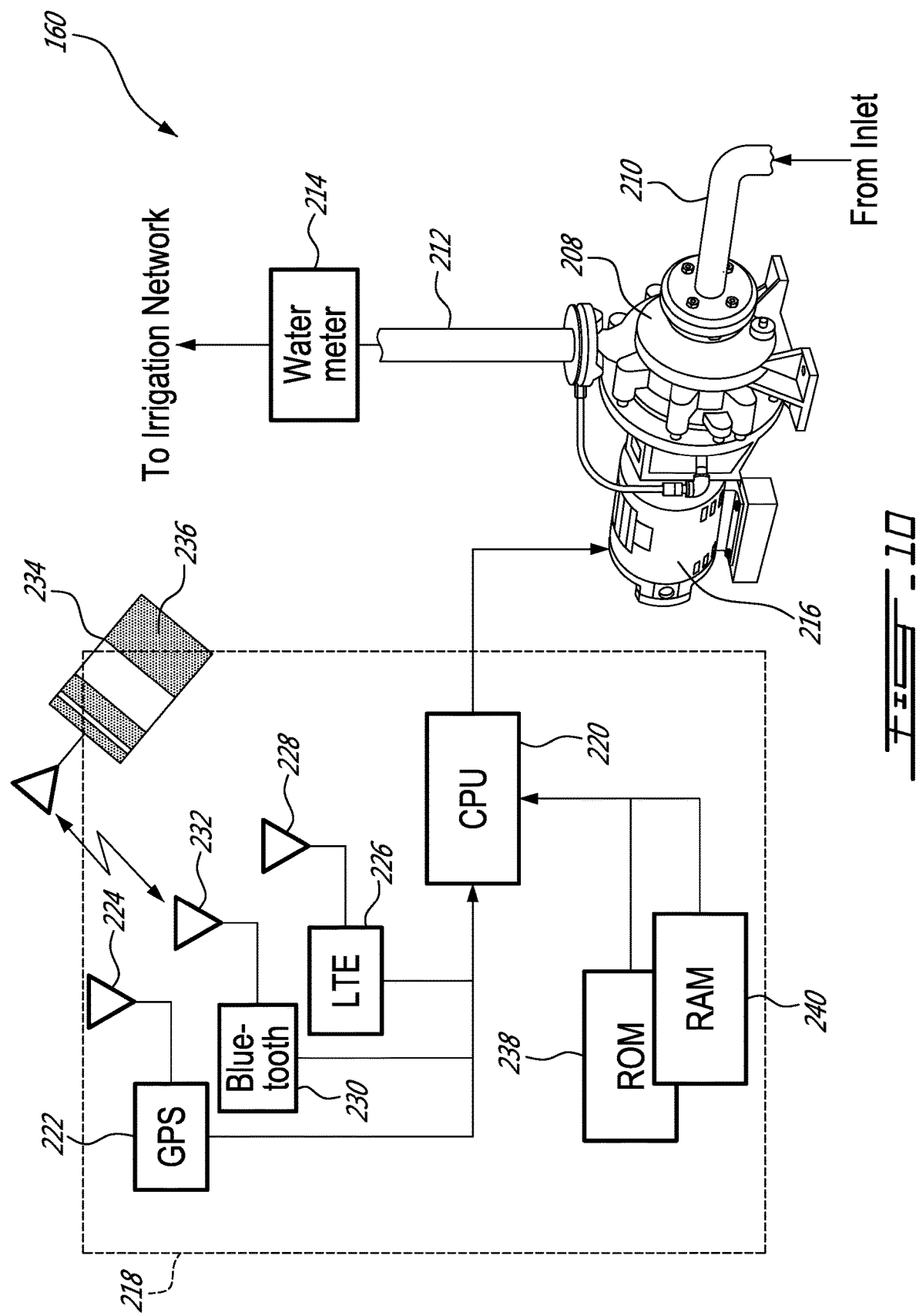

ALTERNATE WETTING AND DRYING (AWD) SYSTEM AND METHOD

CROSS REFERENCE TO RELATED APPLICATIONS

This application is a divisional application of U.S. application Ser. No. 16/330,834 filed on Mar. 6, 2019 which itself is a National Entry Application of PCT application No. PCT/CA2017/051045 filed on Sep. 7, 2017 and published in English under PCT Article 21(2), which itself claims benefit of U.S. provisional application Ser. No. 62/384,318, filed on Sep. 7, 2016. All documents above are incorporated herein in their entirety by reference.

FIELD OF THE INVENTION

The present invention relates to an alternate wetting and drying (AWD) system and method.

BACKGROUND TO THE INVENTION

In many regions of the world, agriculture lands requiring irrigation are located adjacent estuaries or tidal rivers having a river mouth at a salt body of water (such as an ocean) and such that a salinity of the watercourse varies irregularly over time and as a function of a number of factors such as tides, currents, run off and the like. In particular, the salinity tends to increase gradually as the watercourse nears the river mouth, while the relative salinity at any given point along the water course typically varies over a period of time.

Alternate Wetting and Drying (AWD), defined as the periodic drying and re-flooding of fields during cultivation, is a management practice in irrigated fields, typically rice paddies or the like, that saves water and reduces greenhouse gas emissions while maintaining yields. Existing AWD practice involves alternatively flooding a field and letting it dry until the water level below the soil surface has reached a predetermined depth, as measured through the use of a field water tube placed in the soil. Currently, farmers must measure the water levels in the field water tube manually, which can be tedious and require constant monitoring to avoid negatively impacting their yield.

SUMMARY OF THE INVENTION

In order to address the above, there is provided an Alternate Wetting and Drying (AWD) method for irrigating a field using a pump comprising an outlet supplying water to the field and an inlet connected to a water source. The method comprises placing a water depth sensor at a sensing location in the field, sensing using the sensor from time to time a water depth below a surface of the field at the sensing location, and transmitting the sensed water depth to a pump controller located remotely from the sensing location using a wireless connection. The pump controller enables the pump when the sensed water depth is below a threshold depth and disables the pump when the sensed water depth is above a threshold depth.

Also, there is provided an Alternate Wetting and Drying (AWD) system for irrigating a field using a water source. The system comprises at least one sensing tube each placed at a respective location on the field, the sensing tube comprising a sensor for measuring a water depth below a surface of the field, at least one pump each comprising an inlet connected to the water source, an outlet supplying water to the field and a pump controller, and a wireless communication system interconnecting each of the sensors with the pump controllers of a respective one of the pumps. The pump controller receives from time to time the water depth from the sensor via the wireless communication system, and further wherein the pump controller enables or disables the pump in accordance with the water depth.

BRIEF DESCRIPTION OF THE DRAWINGS

FIG. 4 provides a schematic diagram of a pump assembly in accordance with an illustrative embodiment of the present invention;

FIGS. 5A through 5J provide screen grabs from a hand held device used for providing user input to the irrigation and e-commerce system in accordance with an illustrative embodiment of the present invention;

FIG. 7 provides a detailed schematic diagram of an alternate wetting and drying system in accordance with an illustrative embodiment of the present invention;

FIG. 8A provides a schematic diagram of a plurality of sensing tubes in accordance with an illustrative embodiment of the present invention;

FIG. 10 provides a schematic diagram of a pump assembly in accordance with an illustrative embodiment of the present invention.

DETAILED DESCRIPTION OF THE ILLUSTRATIVE EMBODIMENTS

Figure 1:
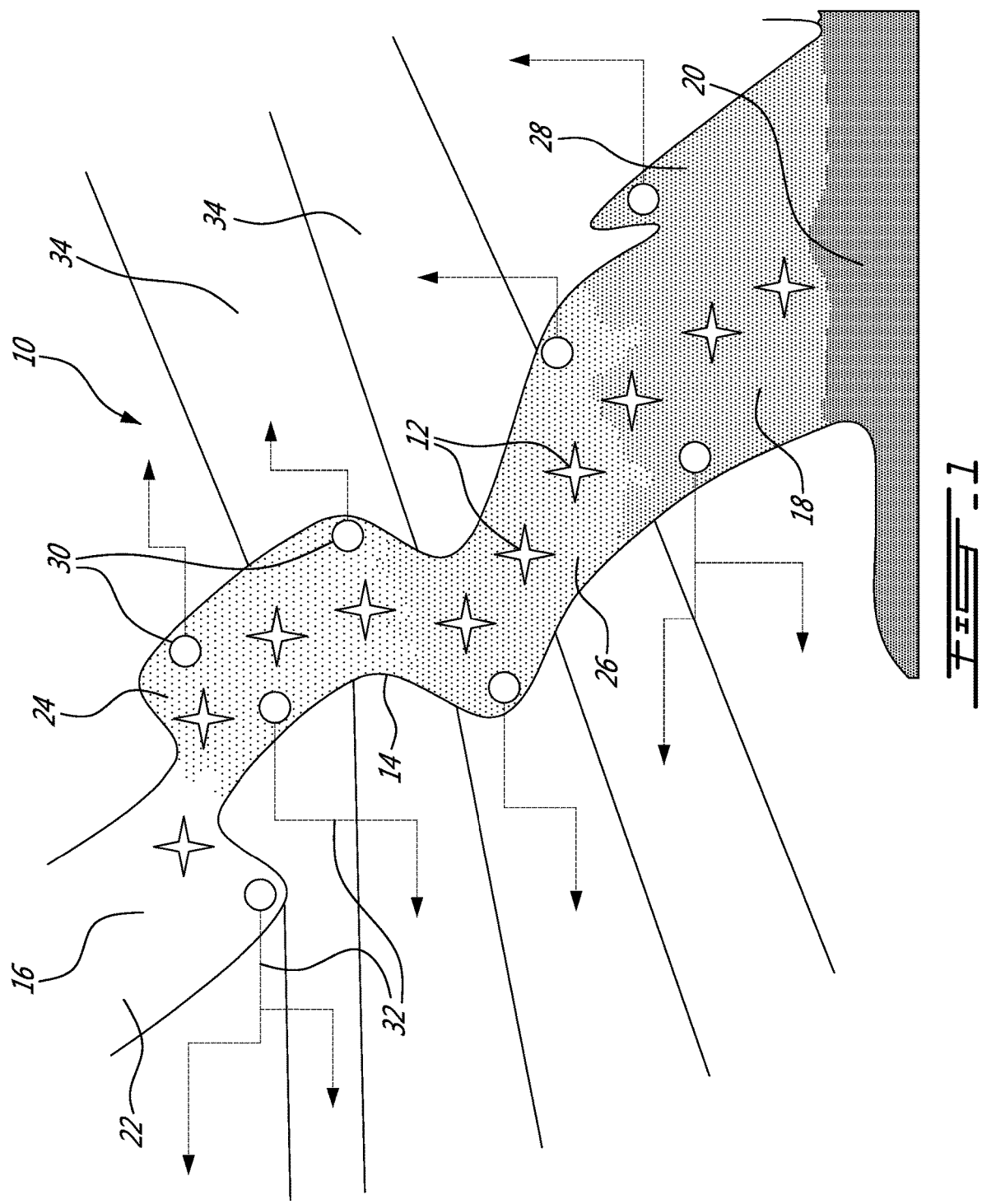
FIG. 1 provides a schematic diagram of an irrigation system in accordance with an illustrative embodiment of the present invention.

Referring now to FIG. 1, an irrigation system, and generally referred to using the reference numeral 10, will now be described. The system comprises a first plurality of sensor buoys 12 anchored at first locations along a length of a watercourse 14 such as an estuary or the like along which water 16 flows from its source (not shown) to a river mouth 18 which empties into a body of salt water 20 such as an ocean or the like. The buoys 12 are provided with a sensor package for measuring salinity, pH, temperature, dissolved oxygen content (DOC) and turbidity. The sensed salinity, pH, temperature, DOC and turbidity of the water 16 in the watercourse 14 varies in time and distance along the length of the watercourse 14 primarily in response to tidal conditions but also due to other conditions such as increased water flow due to run off and the like. In particular, the salinity of the water 16 may vary from fresh 22 through brackish 24 to salty 26 and eventually salt water 28 at points along the watercourse 14. The pH of the water can also effect irrigation and typically a slightly acidic value of between pH 5.5 and pH 6.5 is sought after. Additionally, a basic pH can cause sedimentation of salts which can clog irrigation equipment. Fertilizers can be added to the lands being irrigated to adjust the pH. DOC may be measured as a ratio of the measured oxygen in the water versus the maximum amount of oxygen the water can hold. Alternatively DOC can be measured in milligrams per litre (mg/l), moles per cubic metre (mol $O_2/m^3$) or parts per million (ppm) or the like. Of note is that dissolved oxygen concentration measurements may be affected by temperature, pressure and salinity which should be accounted for. The amount of Turbidity is typically a reflection of the amount of solids suspended in the water and can be measured as Nephelometric Turbidity Units (NTU).

Still referring to FIG. 1, a second plurality of pumps (not shown) having inlets 30 are distributed at second locations along a length of the watercourse 14. Each pump is additionally connected to an irrigation network 32 which irrigate one or more fields 34 when the pump is enabled using water collected via their respective inlets.

Figure 2:
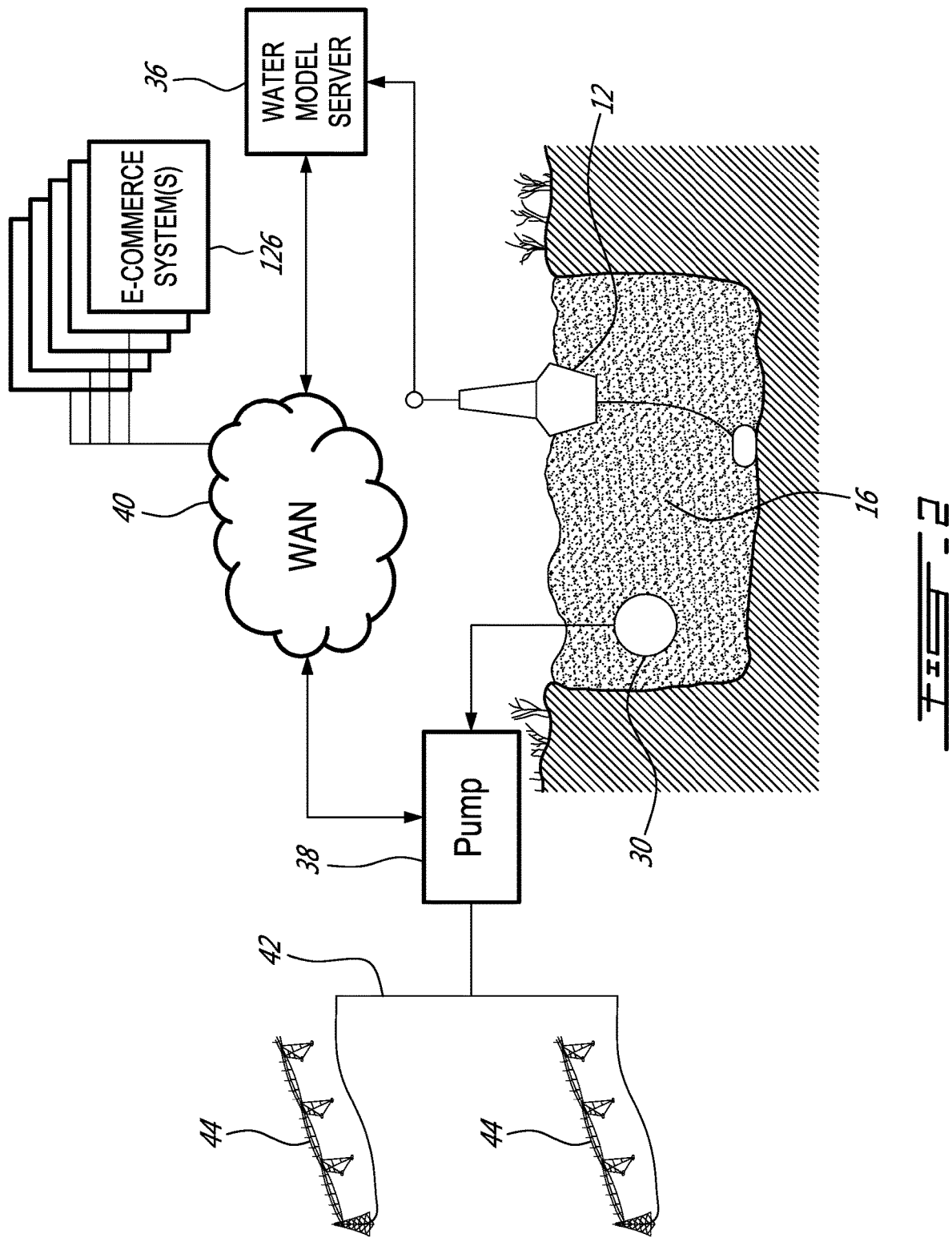
FIG. 2 provides a detailed schematic diagram of an irrigation system in accordance with an illustrative embodiment of the present invention.

Referring now to FIG. 2, the readings of each sensor buoy 12, and as will be discussed in more detail below the location of the sensor buoy 12 and the time when the reading was taken, are illustratively received from time to time at a water model server 36 and a model of the salinity, pH temperature and/or turbidity of the water at any particular point along the watercourse 14 derived therefrom. In this regard, and as will be discussed in more detail, the readings can be collected via a communication system. In particular, the model is used to predict the real time salinity, pH temperature and/or turbidity at the location of each of the inlets 30. The real time salinity, pH, temperature and/or turbidity is illustratively provided to one or other of the pump assemblies 38 via a broadband communication system 40 such as a Wide Area Network (WAN), for example the Internet. As discussed above, each of the pump assemblies 38 supplies an irrigation network 32 comprising, for example irrigation ditches or sprinklers or the like, or other equipment such as piping 42 and pivots 44. Typically, there are many more pump assemblies 38 than sensor buoys 12 and such that the readings from a given sensor buoy 12 will typically effect the operation of a number of pump assemblies 38.

Still referring to FIG. 2, a variety of modelling approaches may be applied to predict the real time salinity, pH, temperature, DOC and/or turbidity at the location of each of the inlets 30 based on the readings of each sensor buoy 12. In particular, in a particular embodiment features such as the speed of water flow, which is locally influenced by inter alia the depth and the width of the watercourse, are taken into account.

Figure 3:
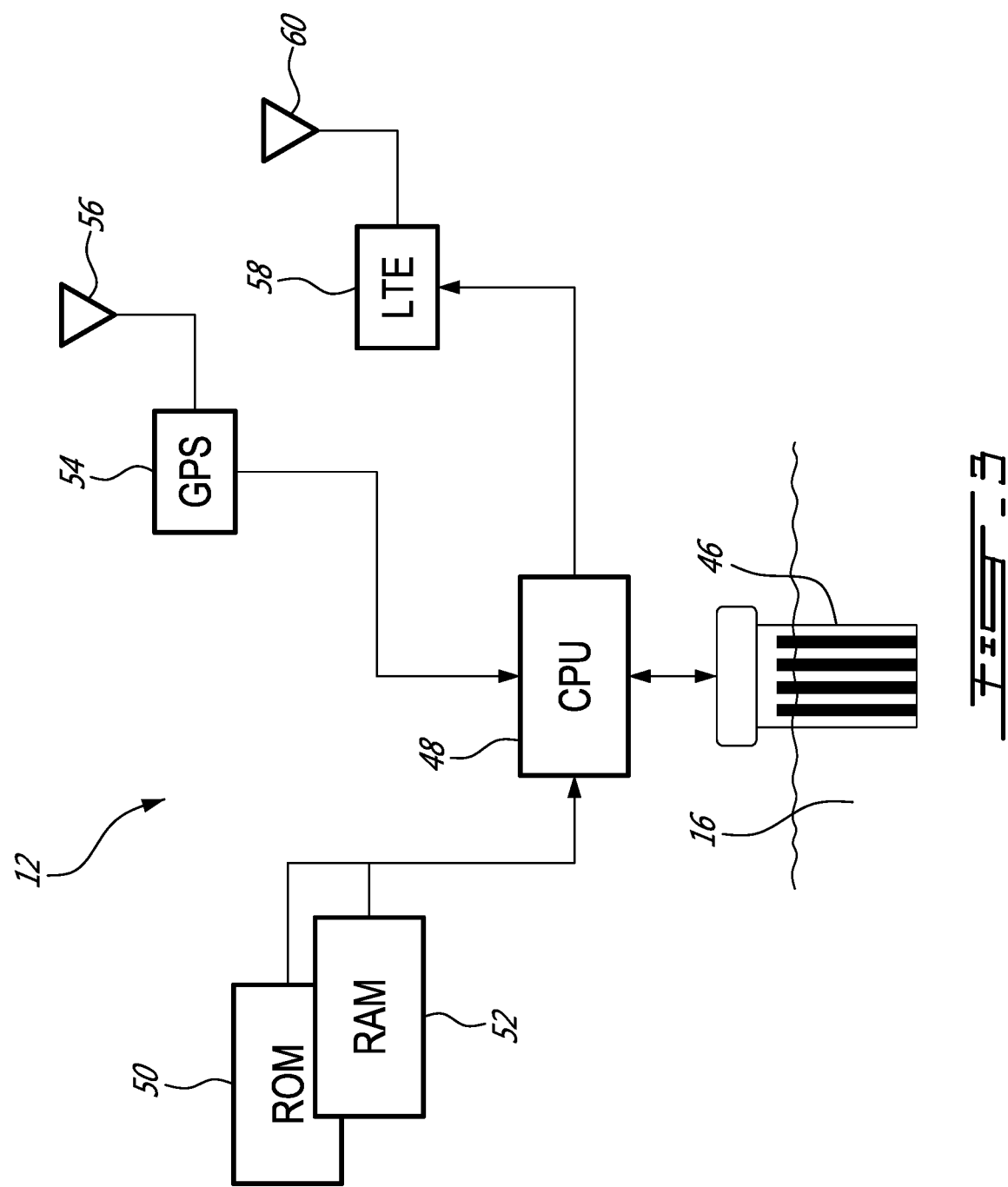
FIG. 3 provides a schematic diagram of a salinity sensor in accordance with an illustrative embodiment of the present invention.

Referring now to FIG. 3, the sensor buoy 12 comprises a probe 46 controlled by a microprocessor (CPU) 48 which illustratively measures the electrical conductivity (EC), the pH, the temperature and/or the turbidity of the water 16. As known in the art, the EC of water increases as the amount of salt dissolved in the water increases. If water forms part of the electrical circuit, the EC is measured as Siemens, which is the reciprocal of resistance measured in ohms. Typically, using programs settings stored in a Read Only Memory (ROM) 50 and/or a Random Access Memory (RAM) 52, readings of the variable conductivity are converted into a measured salinity by the CPU 50, for example using a look up table or formula also stored in the ROM 50 and/or RAM 52 or the like which provides a conversion of EC into total dissolved salts (TDS), measured as parts per million (ppm) measurement of the amount of salt dissolved in the water. Similarly, the pH of water changes with the hydrogen-ion concentration and can be measured as a difference in electrical potential between a pH electrode and a reference electrode (both not shown). As discussed above, the sensor buoy 12 may also comprise a thermometer, DOC sensor and turbidity sensor (also not shown). A Global Positioning System (GPS) module 54 comprising an antenna 56 can also be provided in the system to provide a location of the sensor buoy 12 as well as a universal clock. As also discussed above and with additional reference to FIG. 2, from time to time the measured salinity, pH, temperature, DOC and/or turbidity is transmitted to the salinity mode server 36 via a communication system, illustratively wirelessly via a digital cellular telephone network such as LTE 58 and its associated antenna 60 or Short Messaging Service (SMS) or the like. The measured salinity, pH, temperature and/or turbidity can also be combined with the GPS coordinates of the sensor buoy 12 as well as a time stamp of the time when the transmitted measured salinity took place. In order to provide power to the sensor buoy 12, a storage battery and replenishing solar panel (both not show) or the like is provided.

Referring now to FIG. 4, the pump assembly 38 comprises a pump 62, illustratively a centrifugal pump comprising an inlet pipe 64 connected to the inlet 30 and an outlet pipe 66 connected to the irrigation network 32. The pump 62 is driven by an electric motor 68 under control of a CPU 70 via a pump controller 72. A GPS module 74 and associated antenna 76 can be provided. Additionally, in order to communicate with the water model server 36 via the WAN 40, for example, wireless communications such as those enabled by a digital cellular telephone network such as LTE 78 and its associated antenna 80 is provided. In order to provide power to the pump assembly 38, a storage battery and replenishing solar panel (both not show) or the like may be provided. In particular cases, the pump assembly 38 may also be connected to mains power.

Still referring to FIG. 4, in particular the tolerable salinity for irrigation varies with the type of crops being grown, the type of fertilizers used as well as the type of soil. For example, almonds are typically very sensitive to salt while sunflowers tolerate salt well. Additionally, crops at different stages of plant growth may better tolerate salinity (germinating seeds, for example, are typically affected more by salinity than the mature plant). Climatic conditions can also have an effect as high evaporation rates on hot and/or windy days may lead to evaporation and higher salinity in the remaining water. Finally, the duration of the irrigation cycle may also have an effect, as well as the type of irrigation (for example drip irrigation typically allows a higher salinity water to be used). In view of this, and in order to capture some specific details regarding the particular characteristics of the type of irrigation, crops, soil, fertilizers and the like being irrigated, a near field communications system such as a blue tooth module 82 and associated antenna 84 may also be provided. Using a hand held user device 86 such as a smart phone, tablet or the like, and a water monitor application 88, typically downloaded from an appstore or the like (not shown), the user may adjust the pump control parameters in order to customize pump operation in accordance with the exigencies of the local operating environment.

Still referring to FIG. 4, the CPU 70 controls the pump 62 using programs and user settings stored in a ROM 90 and/or RAM 92 as well as the salinity model, or relative portions thereof, received from the water model server 36 via LTE 78. A variety of different control methods are foreseen. In a first embodiment if the salinity model indicates the salinity at the location of the inlet 30 is above the maximum salinity, the pump 62 is disabled and if the salinity at the location of the inlet 30 is below the maximum salinity the pump 62 is disabled. When enabled, the pump 62 may pump according to the local control parameters.

Figure 5A:
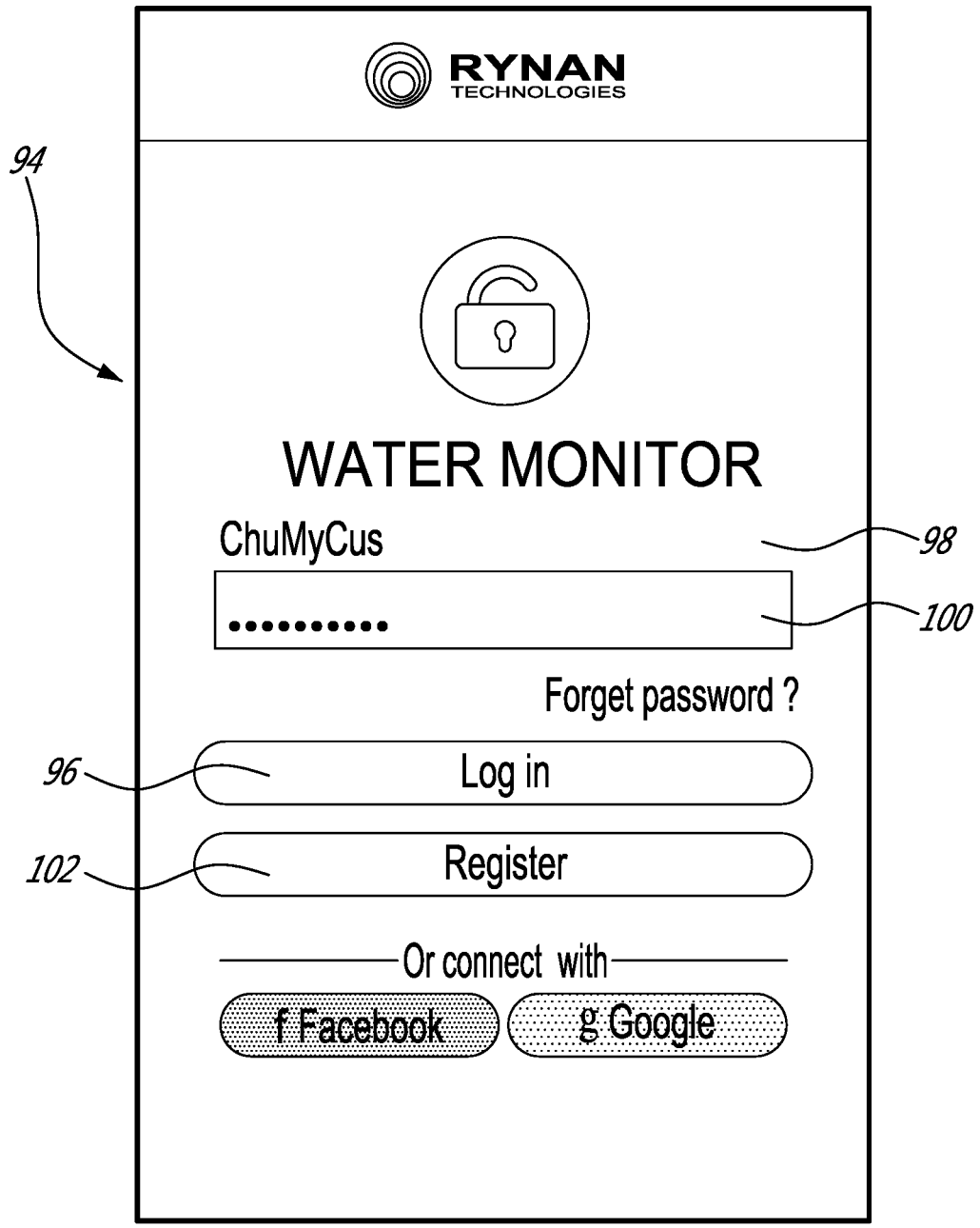
Figure 5B:
Figure 5C:
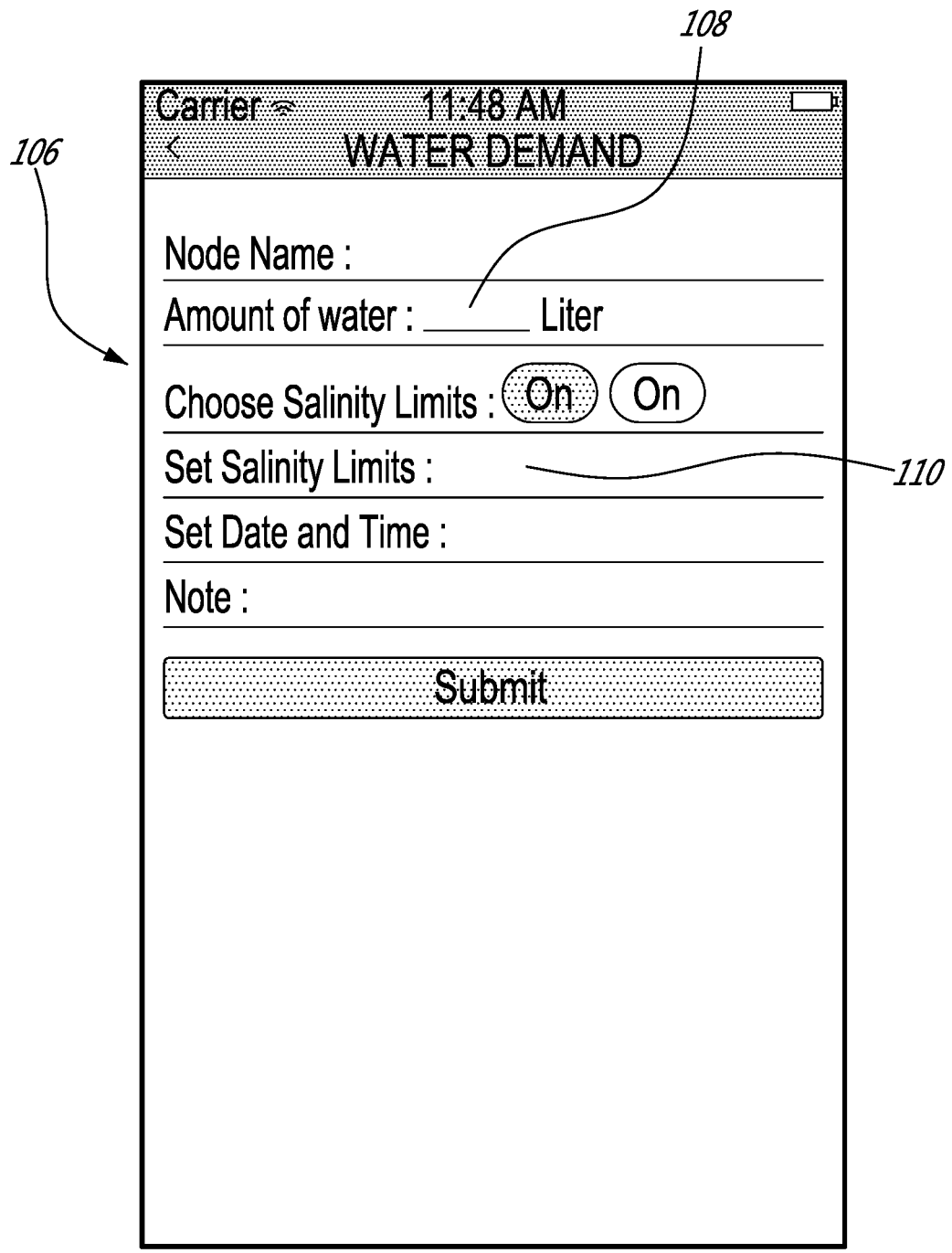
Figure 50:
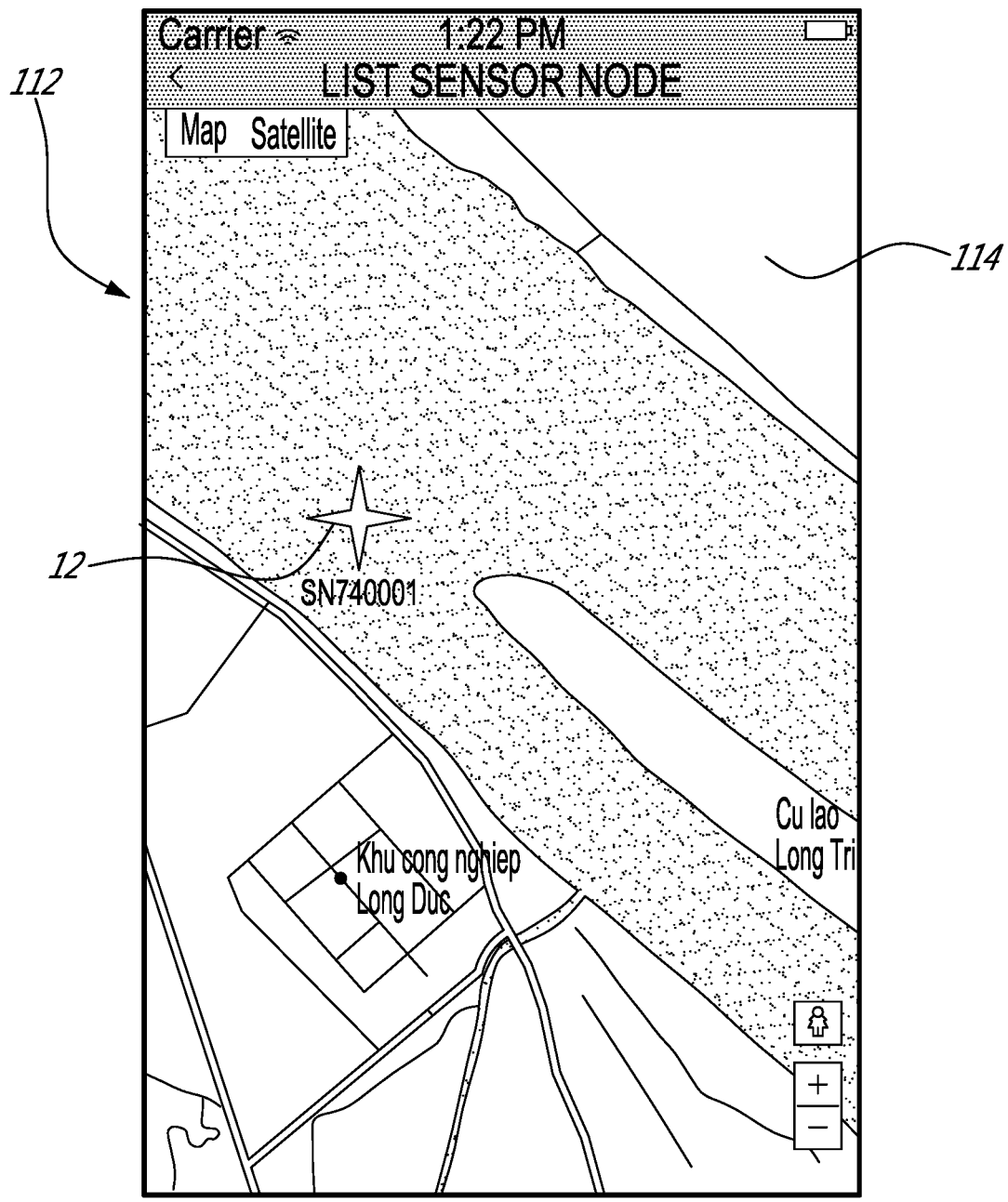
Figure 5E:
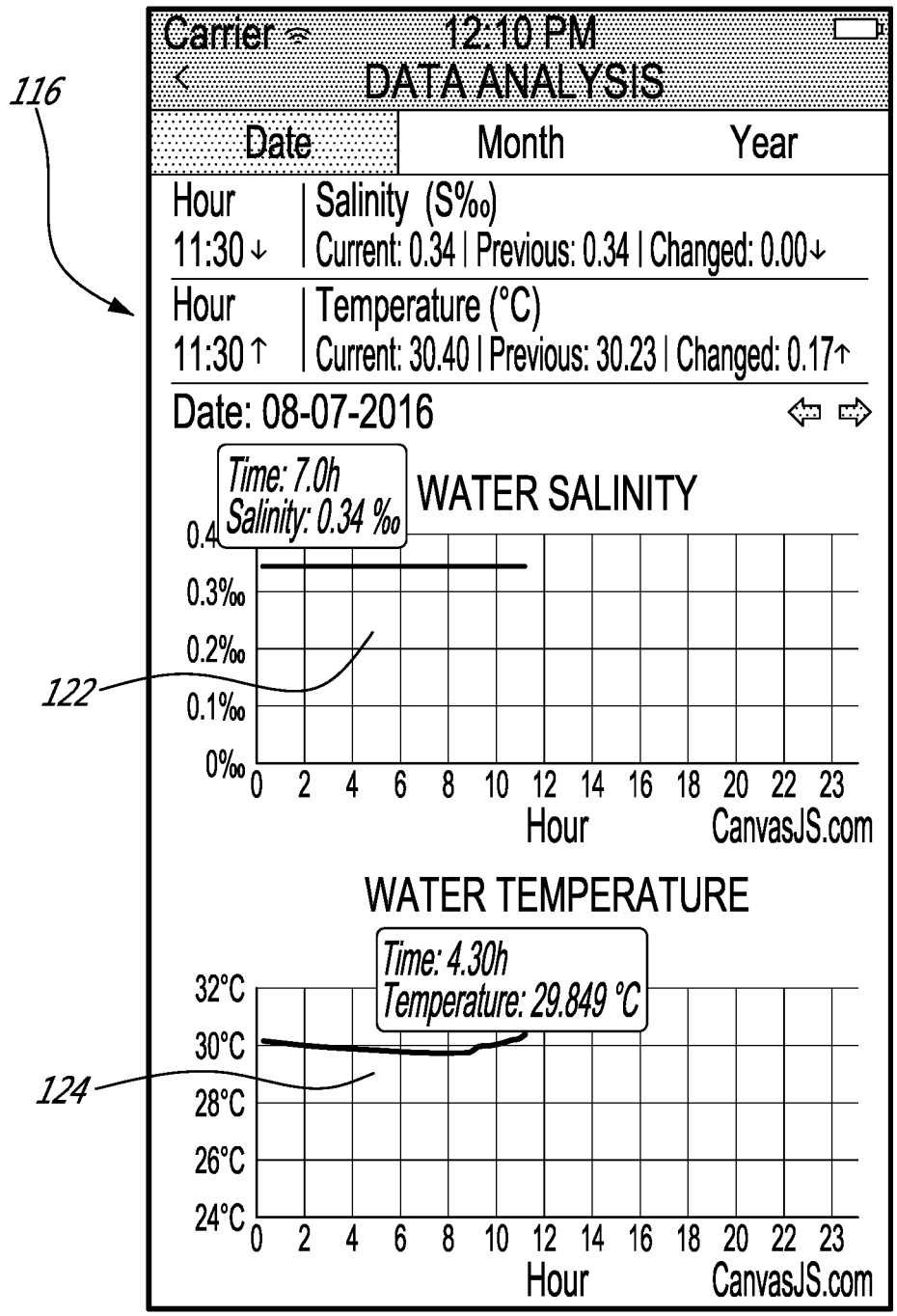
Figure 5F:
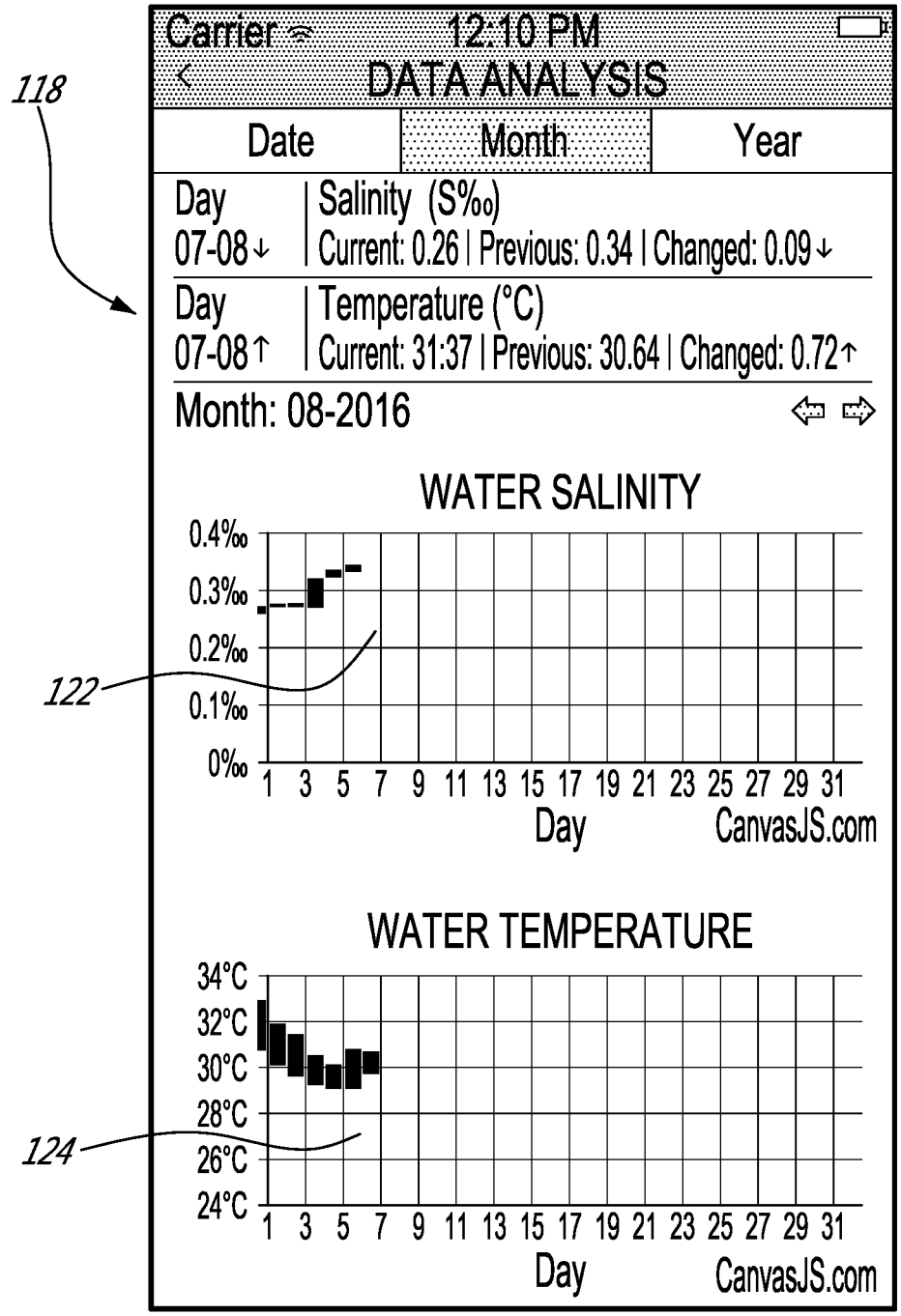
Figure 5G:
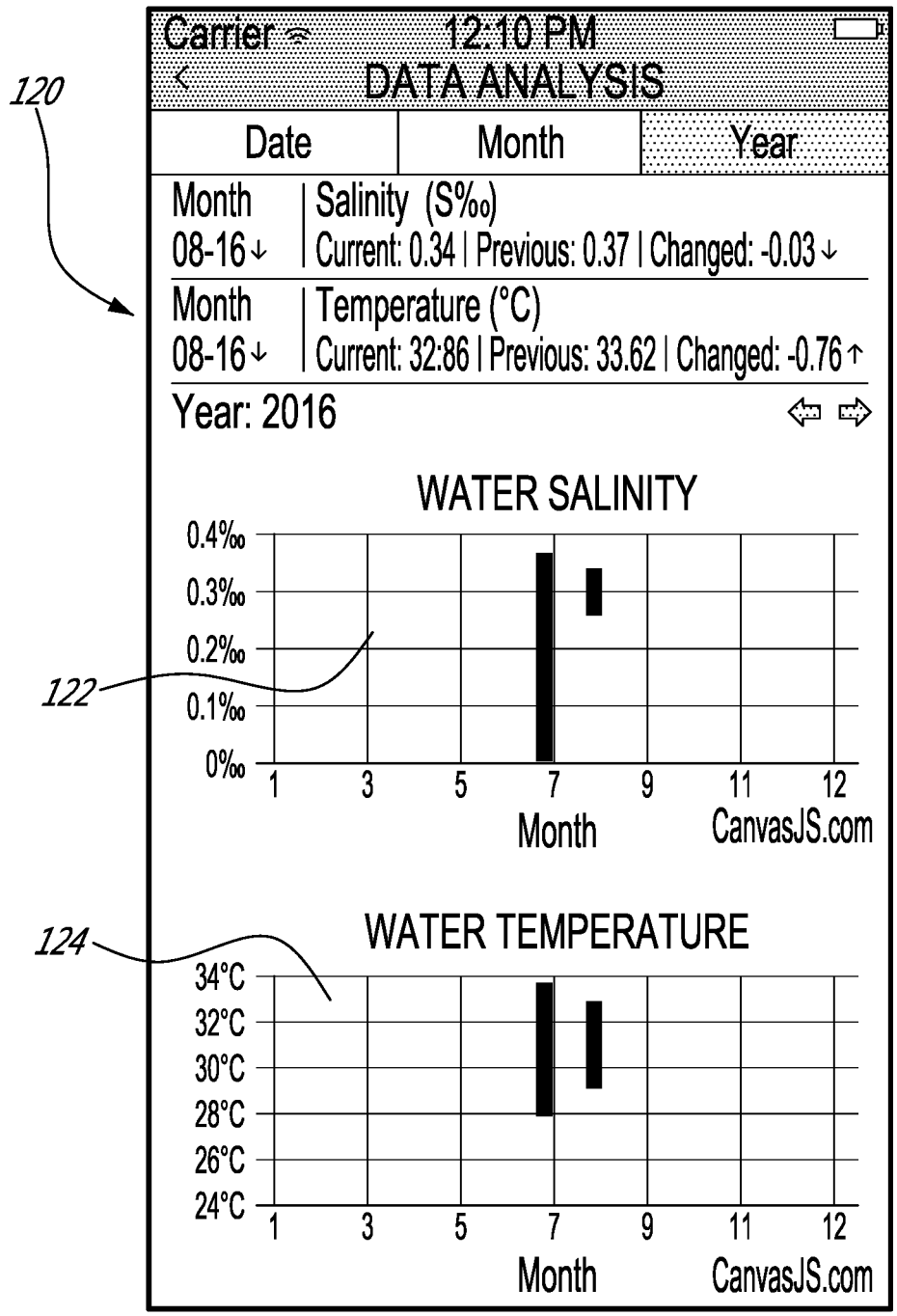

Referring now to FIG. 5A, in order to access the application 88 running on a tablet, smartphone or the like, the user first selects the application causing a login page 94 to be displayed. In order to login, the user selects the "Log in" button 96 while providing a registered name 98 and password 100. If the user has yet to be registered, the user can register with the system by selecting the "Register" button 102. Referring to FIG. 5B in addition to FIG. 5A, selecting the "Register" button 102 displays an account registration page 104 via which the user can enter name, e-mail and the like in order to register for an account. Once logged into the system, the user can select by swiping or via a menu or the like one of a plurality of different views. Referring to FIG. 5C, for a given pump assembly 38 the user can display a water demand page 106 via which the user can provide a target water demand 108 as well as salinity limits 110. Referring to FIG. 5D, using the list sensor node page 112, the user can conveniently display the location of sensor buoys 12 on a map 114. Referring to FIGS. 5E through 5G, water salinity, pH, temperature and turbidity can be displayed for a given pump assembly 38 and/or sensor buoy 12 for a selected period time. Illustratively a daily page 116 (FIG. 5E), a monthly page 118 (FIG. 5F) and a yearly page 120 (FIG. 5G) are shown. Illustratively, for the selected time period a salinity chart 122 and a temperature chart 124 are provided for displaying respectively water salinity and water temperature over the selected time period. Similarly, a pH chart and turbidity chart.

Figure 5H:
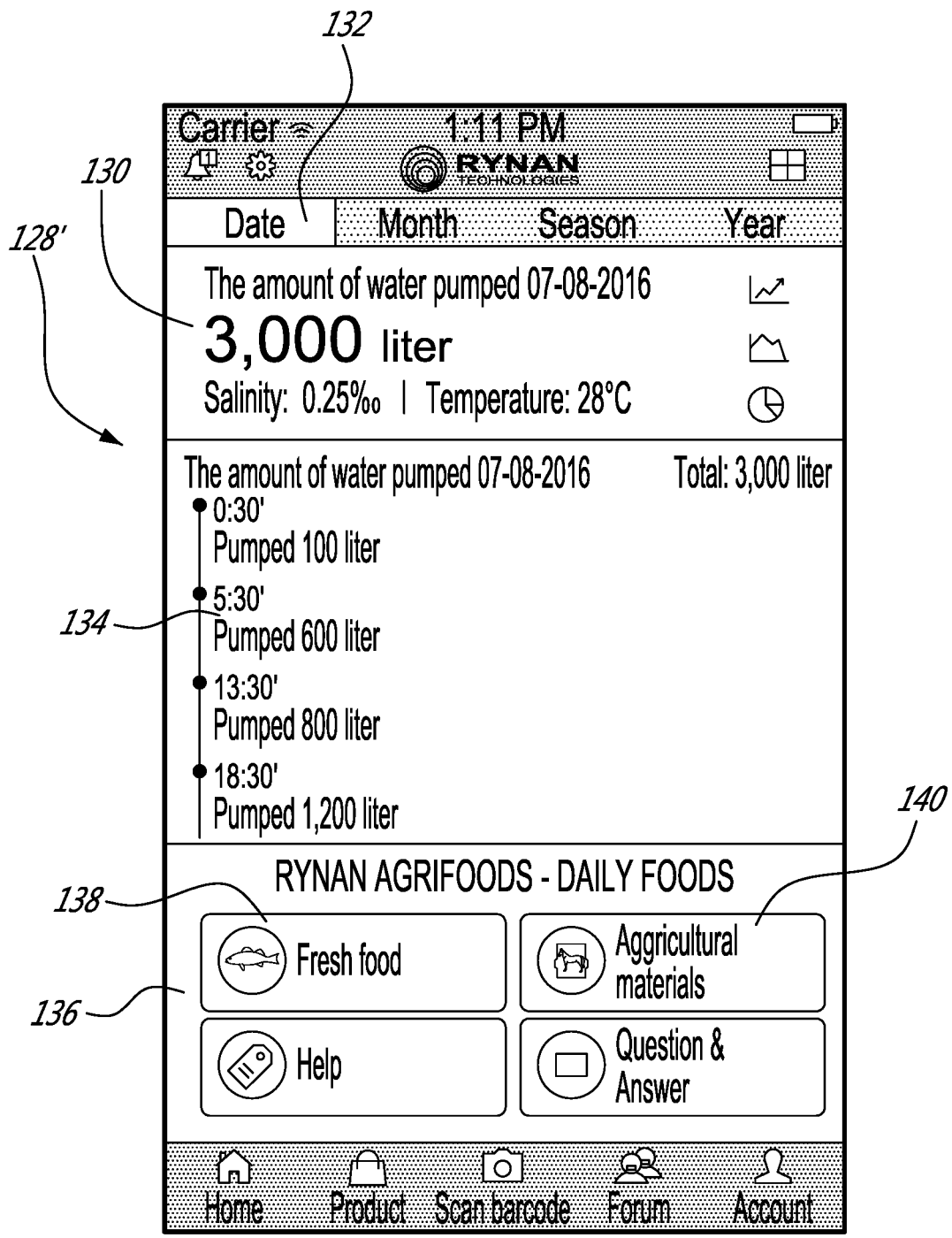
Figure 51:
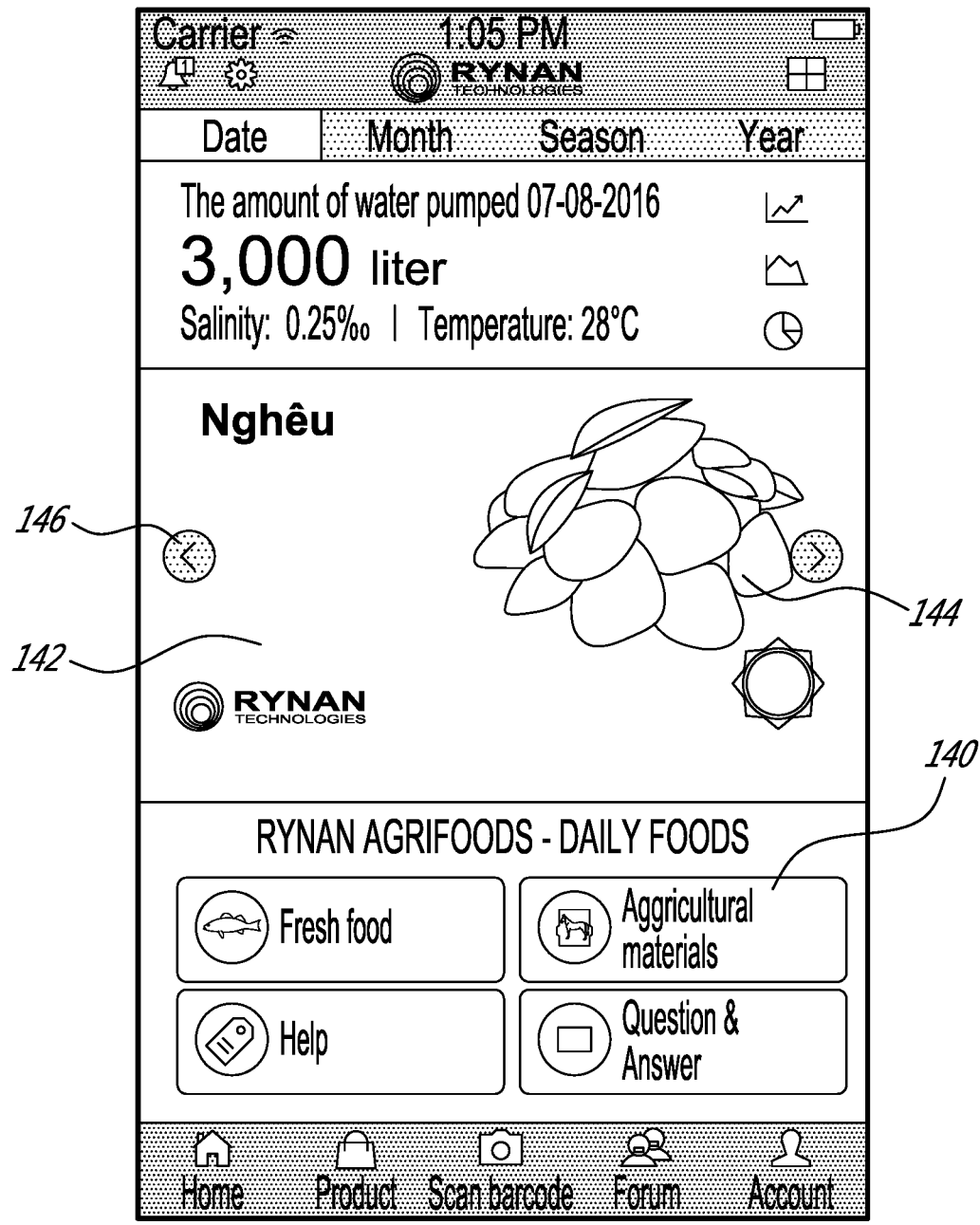
Figure 5J:
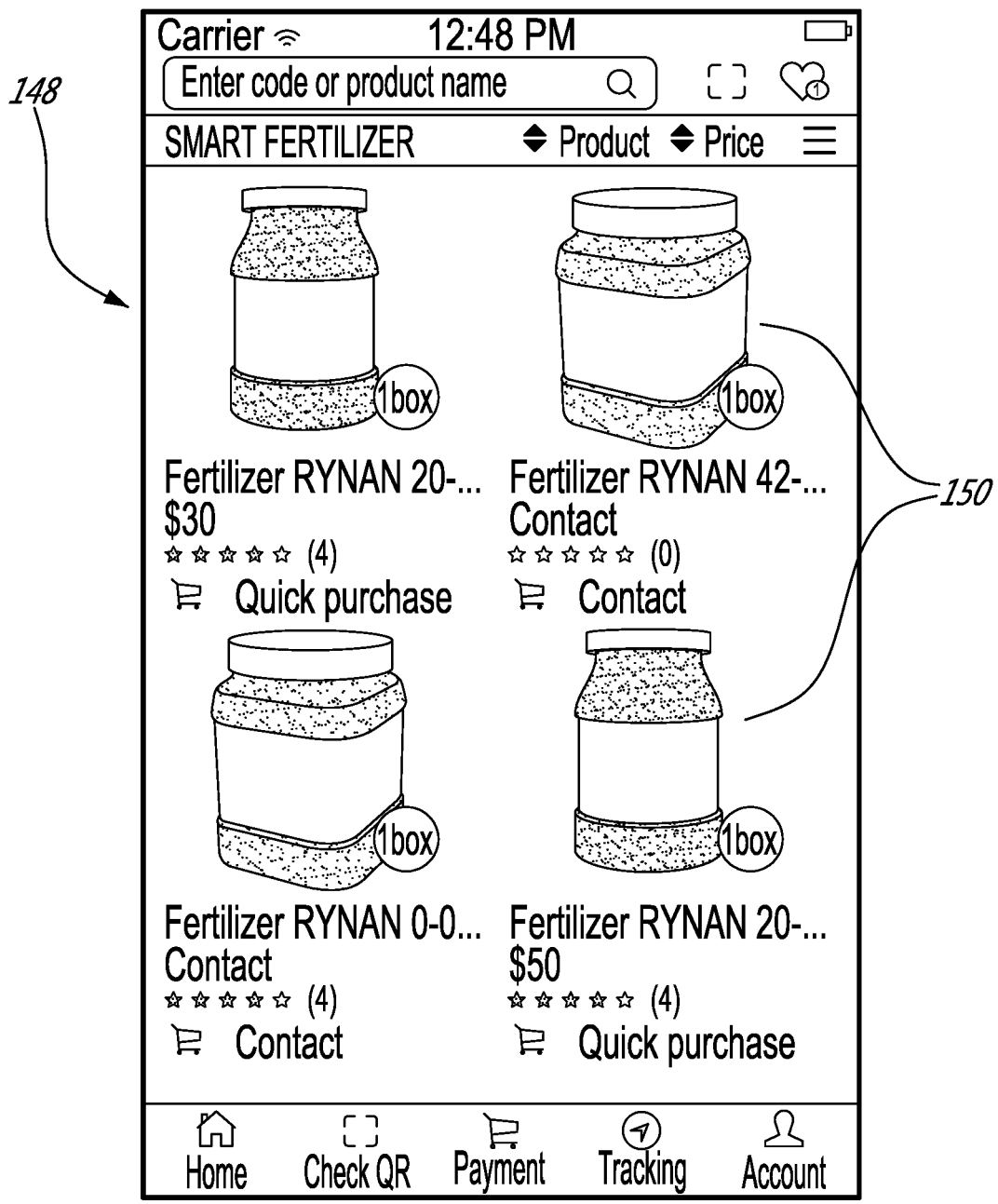

Referring back to FIG. 2, in a particular embodiment at least one E-commerce system 126 may be provided which communicate using the WAN 40. Referring now to FIG. 5H, a page detailing the water pumped 128 is provided detailing the total consumption 130 for the time period 132 by the pump or node in question. The time 134 of pumping may also be provided. Additionally, the user is displayed various icons 136 which detail products available from the E-commerce systems 126. These can include, for example, fresh foods 138 or agricultural materials 140 such as fertilizers or the like. Referring to FIG. 5I, graphics 142 depicting products 144 for purchase via the e-commerce system may be displayed as well as appropriate graphical controls 146 to migrate between different products. Selecting the agricultural materials icon 140, for example, provides an agricultural products page 148 illustratively displaying different fertilizers 150.

Figure 6:
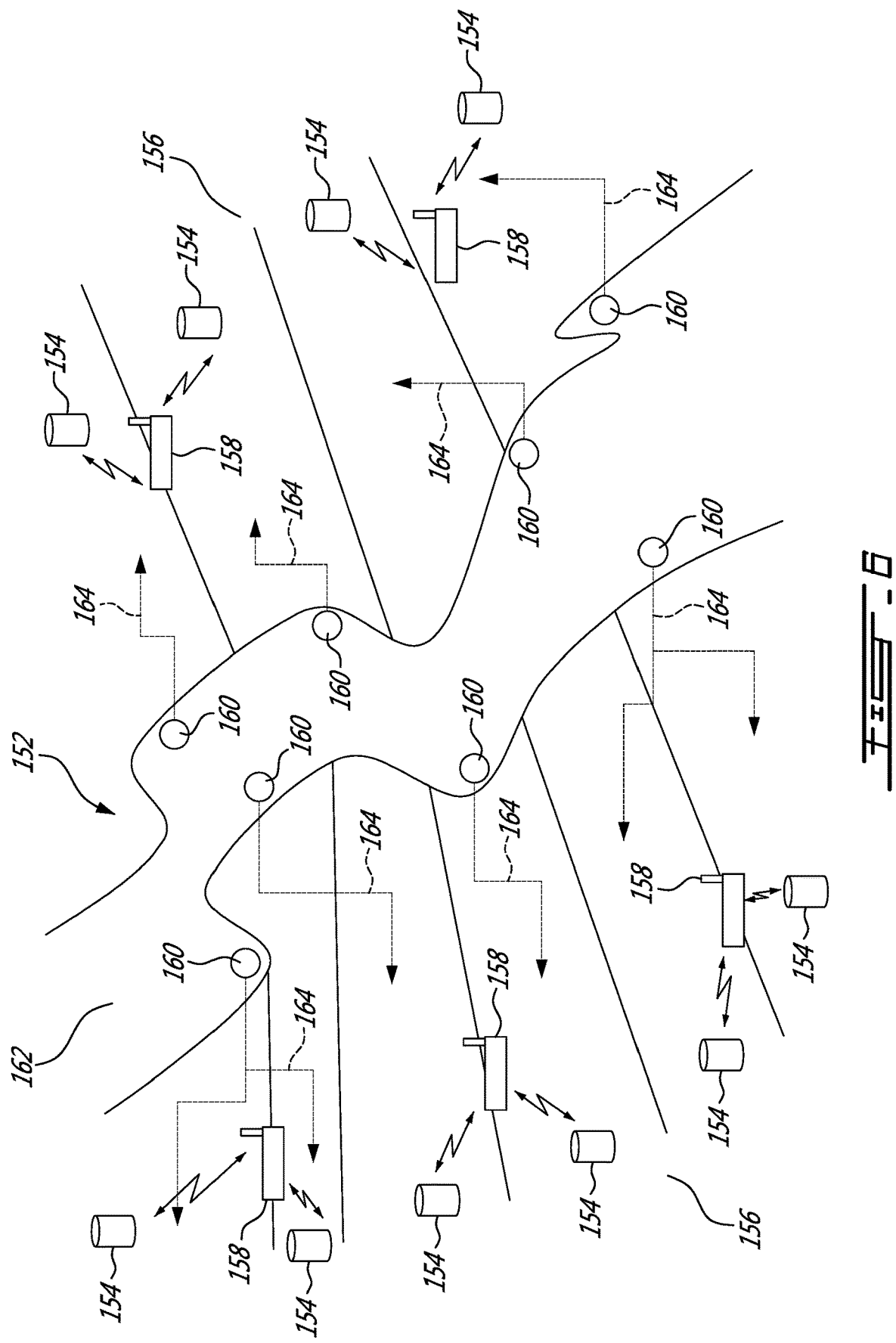
FIG. 6 provides a schematic diagram of an Alternate Wetting and Drying (AWD) system in accordance with an illustrative embodiment of the present invention.

Referring now to FIG. 6, an alternate wetting and drying (AWD) system, generally referred to using the reference numeral 152, will now be described. The system 152 comprises at least one sensing tube 154 placed at a respective location on one or more fields 156 such as rice paddies or the like and at least one network access point 158 in communication with the sensing tubes 154. Each sensing tube 154 is provided with sensing means (not shown) for measuring the water depth beneath a surface of the field 156. The water depth beneath the surface of the field 156 varies in response to various factors such as temperature, humidity, precipitation, flooding and irrigation. In particular, at least one pump assembly 160 drawing water from a water source 162 such as a river is connected to an irrigation network 164 which irrigates the fields 156 when the pump assembly 160 is enabled, thus increasing the water depth beneath the surface of each field 156.

Referring now to FIG. 7, the water depth readings from each sensing tube 154 are sent via an antenna 166 to the nearest network access point 158, as will be discussed in further detail below. The readings can then be collected via a communication system 168 such as a Local Area Network or Wide Area Network (LAN/WAN). As will be discussed in further detail below, when the water depth reading from a given sensing tube 154 falls below a predetermined value, suggesting that the field 156 has been dried out sufficiently, the communication system 168 communicates with the at least one pump assembly 160 via an antenna 170 to enable the pump assembly 160. The pump assembly 160 may then draw water from the water source 162 and pump the water through the irrigation network 164, comprising for example irrigation ditches or sprinklers or the like, in order to flood the field 156, and thus increasing the water level below the surface of the field 156, as reflected by the measurements in the sensing tube 154. This alternation between drying and flooding reduces the amount of water needed for cultivation while maintaining yield rates.

Referring now to FIG. 8A in addition to FIG. 7, each sensing tube 154 comprises sensing means 172 for measuring the water depth 174 beneath a surface 176 of the field 156. In an embodiment, the sensing means 172 comprises a float activated recording device that senses changes in water level by the movement of a weight-balanced float (not shown) that is lowered into the sensing tube 154. As it is known in the art, the water depth 174 beneath the surface 176 fluctuates with the flooding and subsequent drying of the field 156 and corresponds to a wet soil level 178 underneath the surface 176 of the field 156. In order to maintain yield rates while saving as much water as possible, the wet soil level 178 must not drop below a predetermined value, for example fifteen (15) centimeters beneath the surface 176. Thus, the sensing means 172 sense when the water depth 174 reaches the predetermined depth during the drying phase in order to enable the pump assembly 160 to being the flooding phase.

Figure 8B:
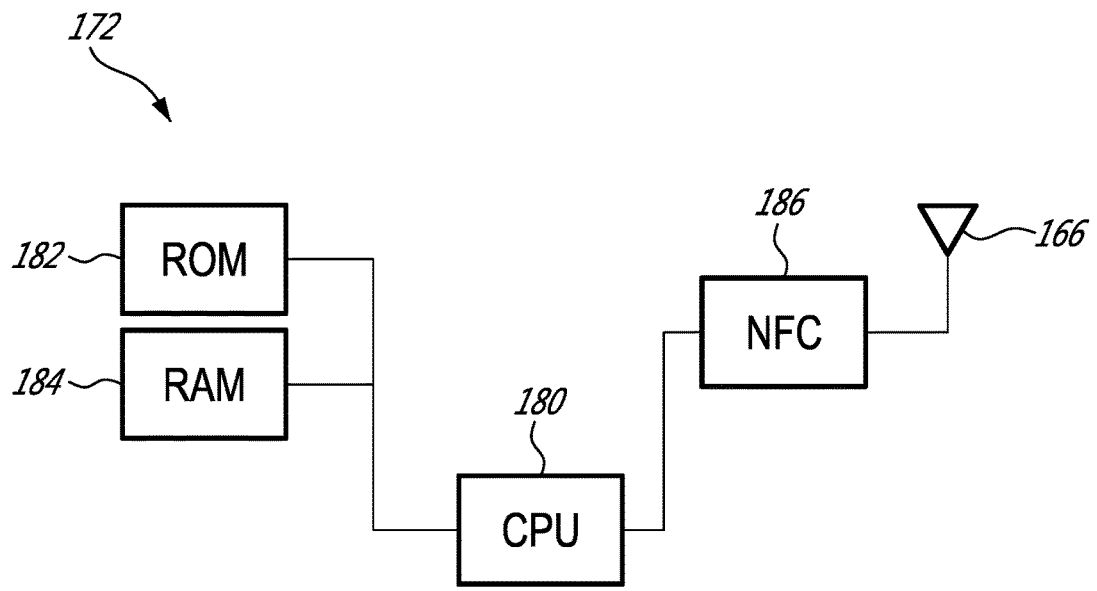
FIG. 8B provides a schematic diagram of sensing means in accordance with an illustrative embodiment of the present invention.

Referring now to FIG. 8B in addition to FIG. 7, the sensing means 172 are controlled by a microprocessor (CPU) 180 which measures the water depth 174 inside the sensing tube 154 using programs stored in a Read Only Memory (ROM) 182 and/or a Random Access Memory (RAM) 184. The measured water depth is transmitted to the nearest network access point 158 via Near Field Communication (NFC) 186, such as Bluetooth or WiFi, and an antenna 166. In order to provide power to the sensing tube 154, a storage battery and replenishing solar panel (both not shown) or the like is provided.

Referring back to FIG. 8A in addition to FIG. 2, as fields 156 often occupy large areas of land of varying conditions, it may be common to find varying wet soil levels 178 along a given field 156. Thus, in an embodiment, the system 152 comprises a plurality of sensing tubes 154 placed along a given field 156 in order to measure the water depth 174 at a plurality of locations.

Figure 9:
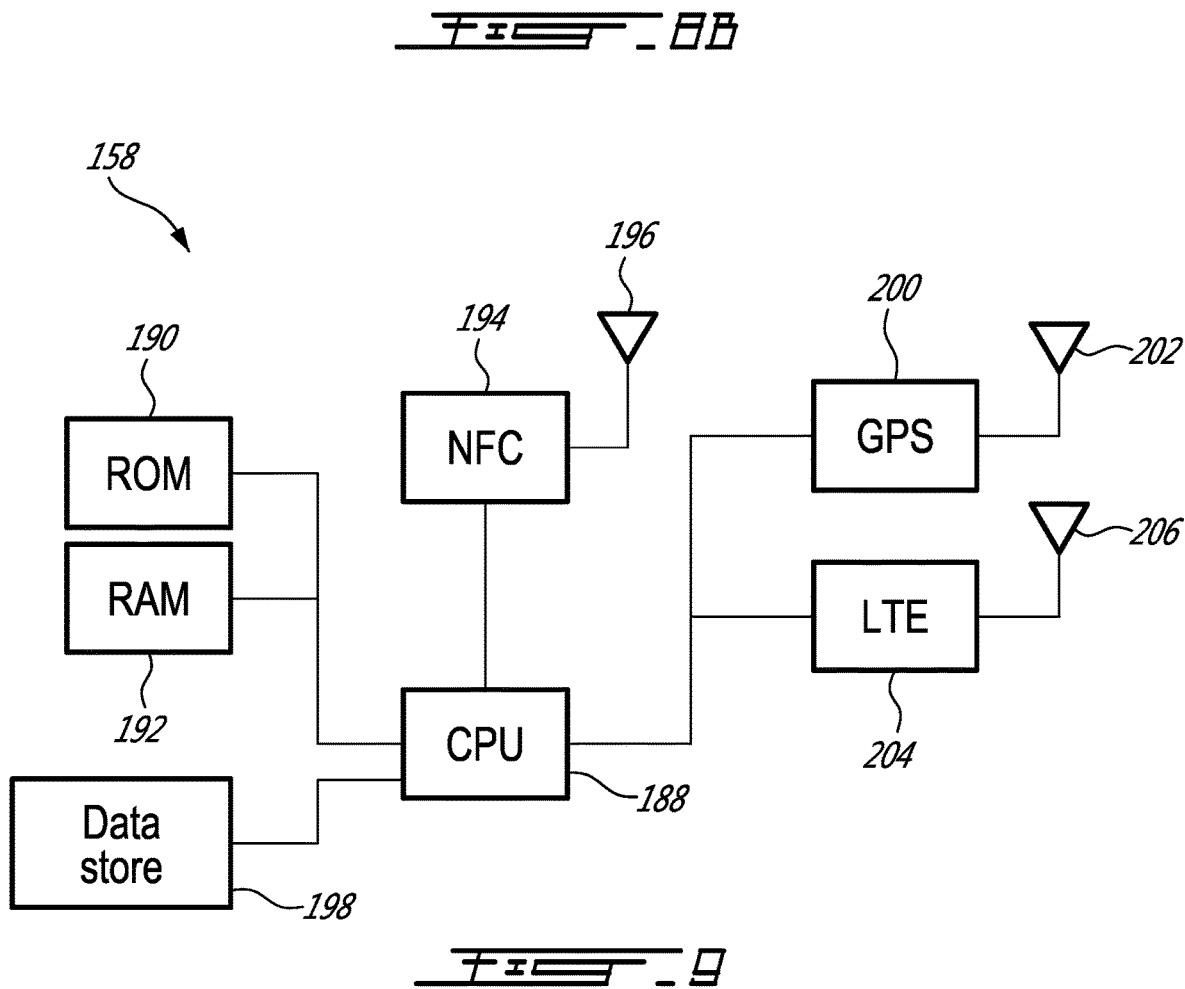
FIG. 9 provides a schematic diagram of a network access point in accordance with an illustrative embodiment of the present invention.

Referring now to FIG. 9 in addition to FIG. 7, each network access point 158 is controlled by a CPU 188 using programs stores in a ROM 190 and/or RAM 192. The network access point 158 receives the measured water depth from the various sensing tubes 154 via NFC 194 and an antenna 196. A data store 198 may be provided for storing previously recorded measured water depths. In an embodiment, a hand held user device and water monitoring application (both not shown) may also connect to the network access point 158 via NFC 194 and antenna 196 to consult previously recorded measured water depths. A Global Positioning System (GPS) module 200 comprising an antenna 202 may also be provided in the network access point 158 to provide a location of the network access point 158 as well as a universal clock. As discussed above, the measured water depths are transmitted to the communication system 168 via communication means, illustratively wirelessly via a digital cellular telephone network such as LTE 204 and its associated antenna 206 or Short Messaging Service (SMS) or the like. The measured water depth may also be combined with the GPS coordinates of the network access point 158 as well as a time stamp of when the transmitted measured water depth took place. In order to provide power to the network access point 158, a storage battery and replenishing solar panel (both not shown) or the like is provided.

Referring now to FIG. 10 in addition to FIG. 7, the pump assembly 160 comprises a pump 208, illustratively a centrifugal pump comprising an inlet pipe 210 connected to an inlet drawing water from the water source 162, and an outlet pipe 212 connected to the irrigation network 164 and may include, for example, a water meter 214 for measuring the amount of water provided using the pump 208. The pump 208 is driven by an electric motor 216 under control of a pump controller 218 comprising a CPU 220. A GPS module 222 and associated antenna 224 may also be provided. Additionally, in order to communicate with each network access point 158 via the communication network 168, communication means such as those enabled by a digital cellular telephone network such as LTE 226 and its associated antenna 228 are provided. In order to provide power to the pump assembly 160, a storage battery and replenishing solar panel (both not show) or the like may be provided. In particular cases, the pump assembly 160 may also be connected to mains power.

Still referring to FIG. 10, and as discussed above, the key variable when operating alternate wetting and drying in the cultivation of rice is the water level below the surface of the field 156. In order to save water without affecting the rice yield, careful monitoring of the water level must be practiced. The water level varies with many different factors, such as temperature, humidity, precipitation, and wind speeds. These factors will affect the optimal duration of time for both the wetting and drying cycles. In view of this, a near field communications system such as a Bluetooth module 230 and associated antenna 232 may also be provided. Using a hand held user device 234 such as a smart phone, tablet or the like, and a water monitor application 236, typically downloaded from an appstore or the like (not shown), the user may adjust the pump control parameters in order to customize pump operation in accordance with the exigencies of the local operating environment.

Still referring to FIG. 10, the CPU 220 controls the pump 208 using programs and user settings stored in a ROM 238 and/or RAM 240 as well as those received from the communication system 168 via LTE 226 or via hand held user device 234 running a water monitor application 236. A variety of different control methods are foreseen. Typically, the AWD system 152 will comprise alternating periods of wetting and drying selected in order to meet particular agriculture management practices. For example, extended periods of wetting increase water consumption and the production of greenhouse gasses, while extended periods of drying can encourage weed growth and lead to an increase damage caused by pests and the like. Additionally, careful selection of the periods of wetting and drying can reduce fertilizer requirements, simplify fertilizer application and simplify the eventual harvesting of the crop when ripe. Using the system 152 an AWD program can be established to maximize these features. In a first embodiment, when measured water depth drops below a first predetermined low value, the pump 208 is enabled, and when the measured water depth exceeds a second predetermined high value, the pump 208 is disabled. When enabled, the pump 208 may pump according to the local control parameters.

Referring back to FIGS. 7, 8A and 8B, in an embodiment, as the communication system 168 receives measured water depths from various locations on a given field 156, the communication system 168 enables the pump assemblies 160 as soon as a single sensing tube 154 provides a measured water depth below the above-mentioned predetermined value. In another such embodiment, the communication system 168 is provided with calculation means (not shown) for calculating the average measured water depth from the received measured water depths from each sensing tube 154 and then enables the pump assemblies 160 once the average measured water depth drops below the above-mentioned predetermined value.

Figure 11A:
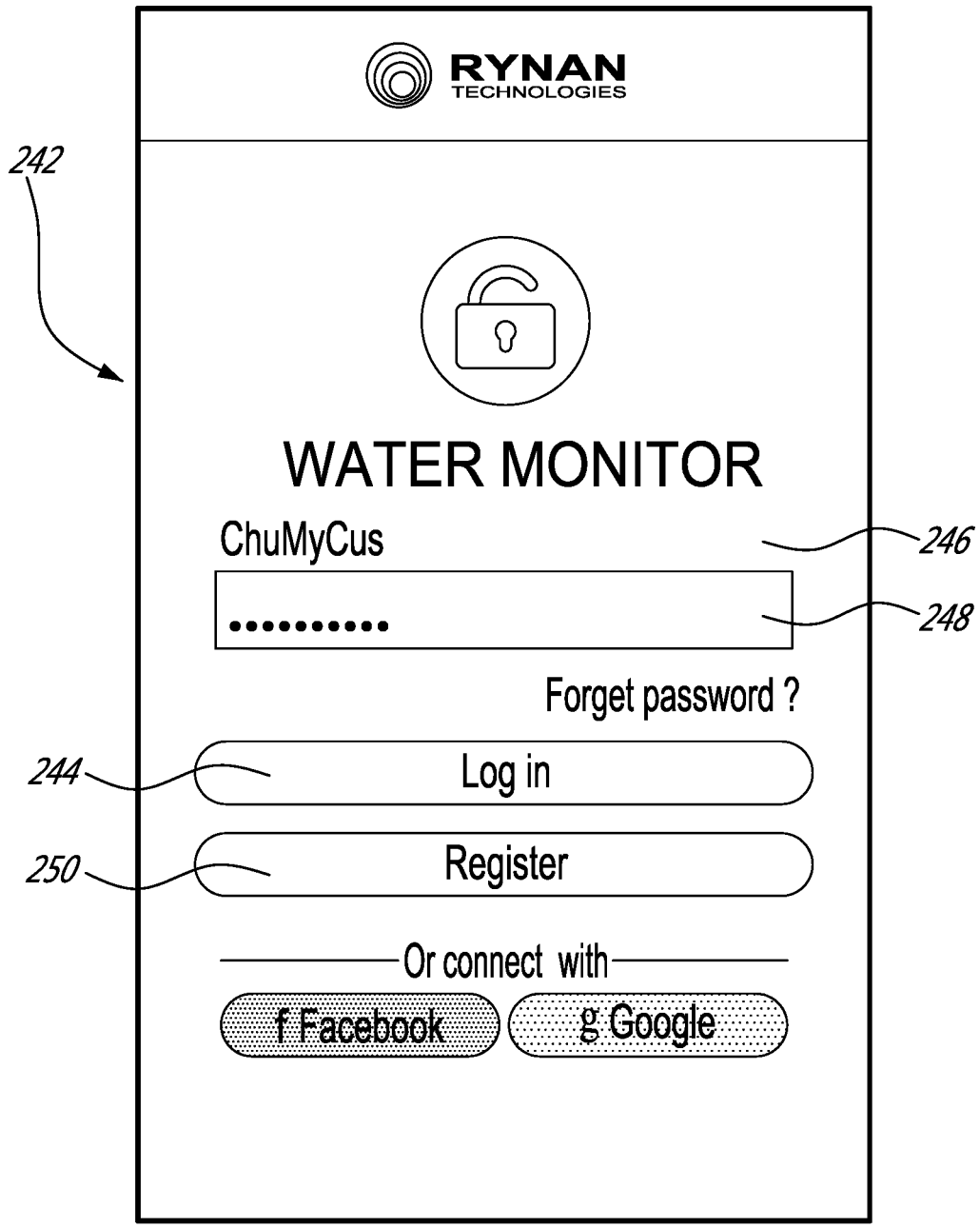
FIGS. 11A through 11C provide screen grabs from a hand-held device used for providing user input to the alternate wetting and drying system in accordance with an illustrative embodiment of the present invention.
Figure 11B:

Referring now to FIG. 11A, in order to access the application 236 running on hand held user device 234 such as a tablet, smartphone or the like, the user first selects the application causing a login page 242 to be displayed. In order to login, the user selects the "Log in" button 244 while providing a registered name 246 and password 248. If the user has yet to be registered, the user can register with the system by selecting the "Register" button 250. Referring to FIG. 11B in addition to FIG. 6A, selecting the "Register" button 250 displays an account registration page 252 via which the user can enter name, e-mail and the like in order to register for an account. Once logged into the system, the user can select by swiping or via a menu or the like one of a plurality of different views.

Figure 11C:
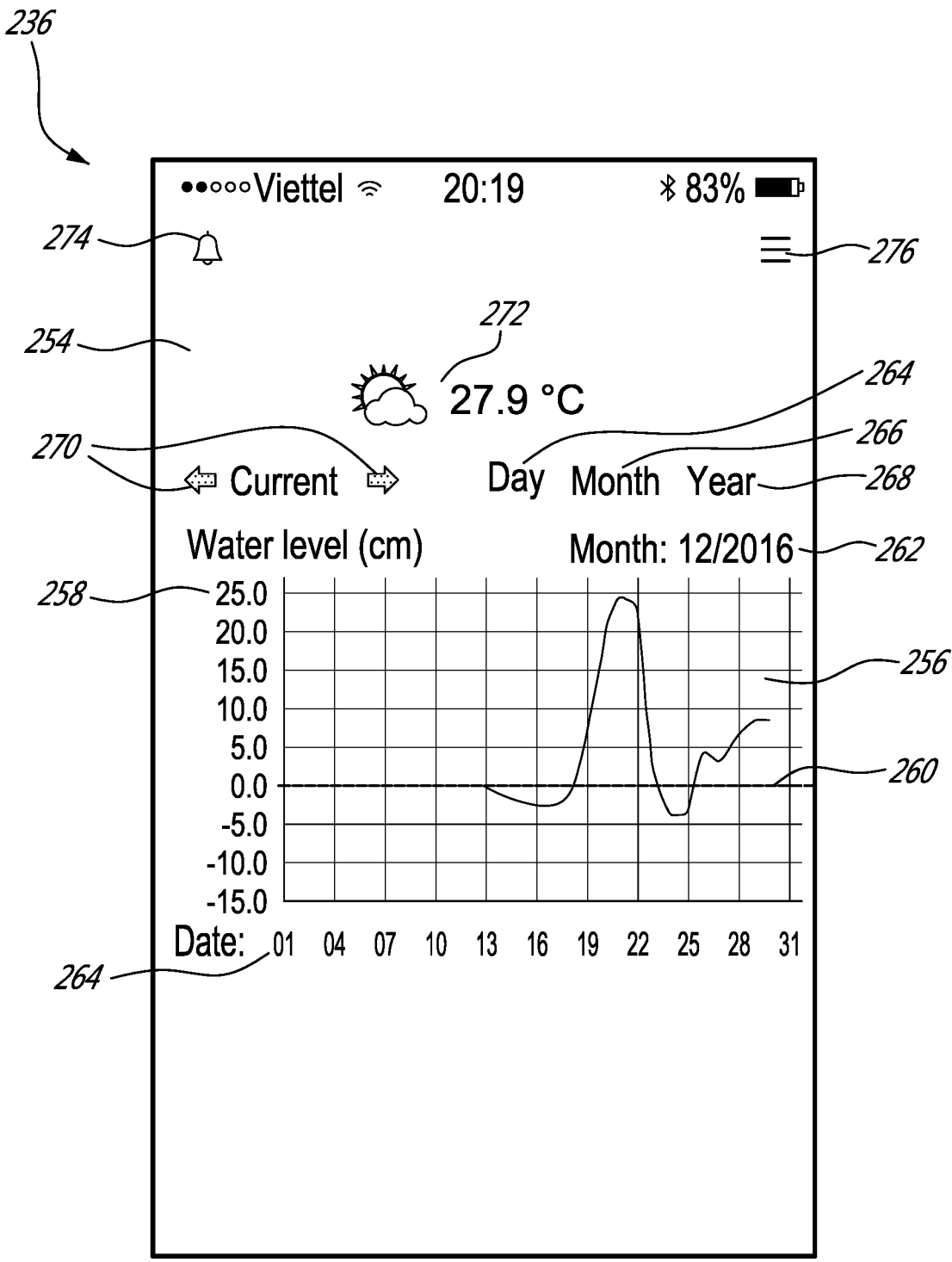

Referring now to FIG. 11C, the application 236 may display a water level page 254 comprising the measured water level from a given sensing tube 154 which is shown on a graph 256 depicting the water level 258, above or below the surface level 260, and the date 262 at which each measurement was recorded. The water level page 254 is configurable to display recorded water level measurements for a given day 264, month 266, and year 268, with migration tools 270 for migrating between desired time periods. The water level page 254 may additionally display the ambient air temperature 272 from a location of interest such as the rice field, and may additionally comprise icons for setting notification alerts 274 and navigation through various menus 276.

Although the present invention has been described hereinabove by way of specific embodiments thereof, it can be modified, without departing from the spirit and nature of the subject invention as defined in the appended claims.

We claim:

1. An Alternate Wetting and Drying (AWD) method for irrigating a field using a pump comprising an outlet supplying water to the field and an inlet connected to a water source, the method comprising:
   placing a water depth sensor at a sensing location in the field;
   sensing using said sensor from time to time a water depth below a surface of the field at the sensing location; and
   transmitting said sensed water depth to a pump controller located remotely from the sensing location using a wireless connection;
   wherein said pump controller enables the pump when said sensed water depth is below a low water depth.

2. The method of claim 1, wherein said low water depth is below a predetermined level of the surface at the sensing location.

3. The method of claim 2, wherein said predetermined level is about 15 centimetres below the surface at the sensing location.

4. The method of claim 1, further comprising a hand held device for interconnection with said pump controller using a near field communication network, said hand held device comprising an application software for displaying said sensed water depth.

5. The method of claim 1, wherein said controller pump disables the pump when said sensed water depth is above a high water depth above said low water depth.

6. An Alternate Wetting and Drying (AWD) system for irrigating a field using a water source, the system comprising:
- a sensing tube placed at a location on the field, said sensing tube comprising a sensor for measuring a water depth below a surface of the field at the location;
- a pump comprising an inlet connected to the water source and an outlet supplying water to the field;
- a pump controller controlling said pump; and
- a wireless communication system interconnecting said sensor with said pump controller;
- wherein said pump controller receives from time to time said water depth from said sensor via said wireless communication system, and further wherein said pump controller enables said pump when said water depth at the location is below a low water depth.

7. The system of claim 6, wherein said low water depth is below a predetermined level below the surface at the sensing location.

8. The system of claim 7, wherein said predetermined level is about 15 centimetres below the surface at the sensing location.

9. The system of claim 6, further comprising a hand held device for interconnection with said pump controller using a near field communication network, said hand held device comprising an application software for displaying said measured water depth.

10. The system of claim 6, wherein said pump controller disables said pump when said measured water depth is above a high depth, and wherein said high depth is above said low depth.

11. The system of claim 6, further comprising a plurality of sensing tubes each placed at a different respective location on the field, each sensing tube comprising a sensor measuring a water depth below a surface of the field at the respective location, said wireless communication system interconnecting each of said sensors with said pump controller and wherein said pump controller enables said pump when said water depth at least one of the locations is below the low water depth.

12. The system of claim 6, further comprising a plurality of sensing tubes each placed at a different respective location on the field, each sensing tube comprising a sensor measuring a water depth below a surface of the field at the respective location, said wireless communication system interconnecting each of said sensors with said pump controller and wherein said pump controller enables said pump when an average of said water depth at all of the locations is below the low water depth.

13. The system of claim 12, further comprising a hand held device for interconnection with said pump controller using a near field communication network, said hand held device comprising an application software for displaying said water depth.

14. A control arrangement for use with a pump comprising an inlet connected to a water source and an outlet supplying water to a field, the arrangement comprising:
- at least one sensing device, each of said at least one sensing device placed at a respective location on the field comprising a sensor measuring a water depth below a surface of the field at the respective location;
- a pump controller enabling and disabling the pump, and
- a wireless communication system interconnecting each of said sensors with said pump controller;
- wherein said pump controller receives from time to time said water depth from each of said at least one sensor via said wireless communication system, and wherein said pump controller enables the pump when said water depth at said least one location is below a low threshold depth.

15. The control arrangement of claim 14, comprising a plurality of sensing devices each placed at one of a plurality of different locations and wherein said pump controller enables the pump when said water depth at any one of the plurality of locations is below a low threshold depth.

16. The control arrangement of claim 14, comprising a plurality of sensing devices each placed at one of a plurality of different locations, wherein said measured water depth at each of different the locations is used to calculate an average water depth and wherein said pump controller enables the pump when said average water depth is below a low threshold depth.

17. The control arrangement of claim 14, wherein said low water depth is below a predetermined level below the surface at the sensing location.

18. The control arrangement of claim 17, wherein said predetermined level is about 15 centimetres below the surface at the sensing location.

* * * * *